United States Patent [19]
Johnston et al.

[11] 3,900,274

[45] Aug. 19, 1975

[54] REMOTE CONTROLLED ACTUATION SYSTEM FOR THE ROTOR OF A GAS TURBINE ENGINE

[75] Inventors: Richard Paul Johnston, Peabody; Dave Baer Levins, Swampscott, both of Mass.

[73] Assignee: General Electric Company, Lynn, Mass.

[22] Filed: June 25, 1974

[21] Appl. No.: 482,857

[52] U.S. Cl. .............................. 416/155; 416/157
[51] Int. Cl. .......................................... B64c 11/44
[58] Field of Search ......................... 416/155, 157

[56] References Cited
UNITED STATES PATENTS

| 2,446,658 | 8/1948 | Maynard | 416/155 |
| 2,490,329 | 12/1949 | Wilde | 416/155 |
| 2,612,228 | 9/1952 | Forsyth | 416/155 |
| 3,840,309 | 10/1974 | Eckes et al. | 416/155 |

FOREIGN PATENTS OR APPLICATIONS

| 712,882 | 11/1941 | Germany | 416/155 |

Primary Examiner—Everette A. Powell, Jr.
Attorney, Agent, or Firm—James W. Johnson, Jr.; Derek P. Lawrence

[57] ABSTRACT

An actuation system is provided for the rotor of a gas turbine engine and includes an electric motor mounted for rotation with the engine rotor together with a generating system consisting of rotor windings which connect electrically to drive the motor, and stator windings which fixedly connect to the stationary portion of the engine. The stator windings may be energized in a controlled manner to induce an electromotive force in the rotor windings and thus provide a power and control signal to drive the electric motor at a controlled speed or direction.

7 Claims, 3 Drawing Figures

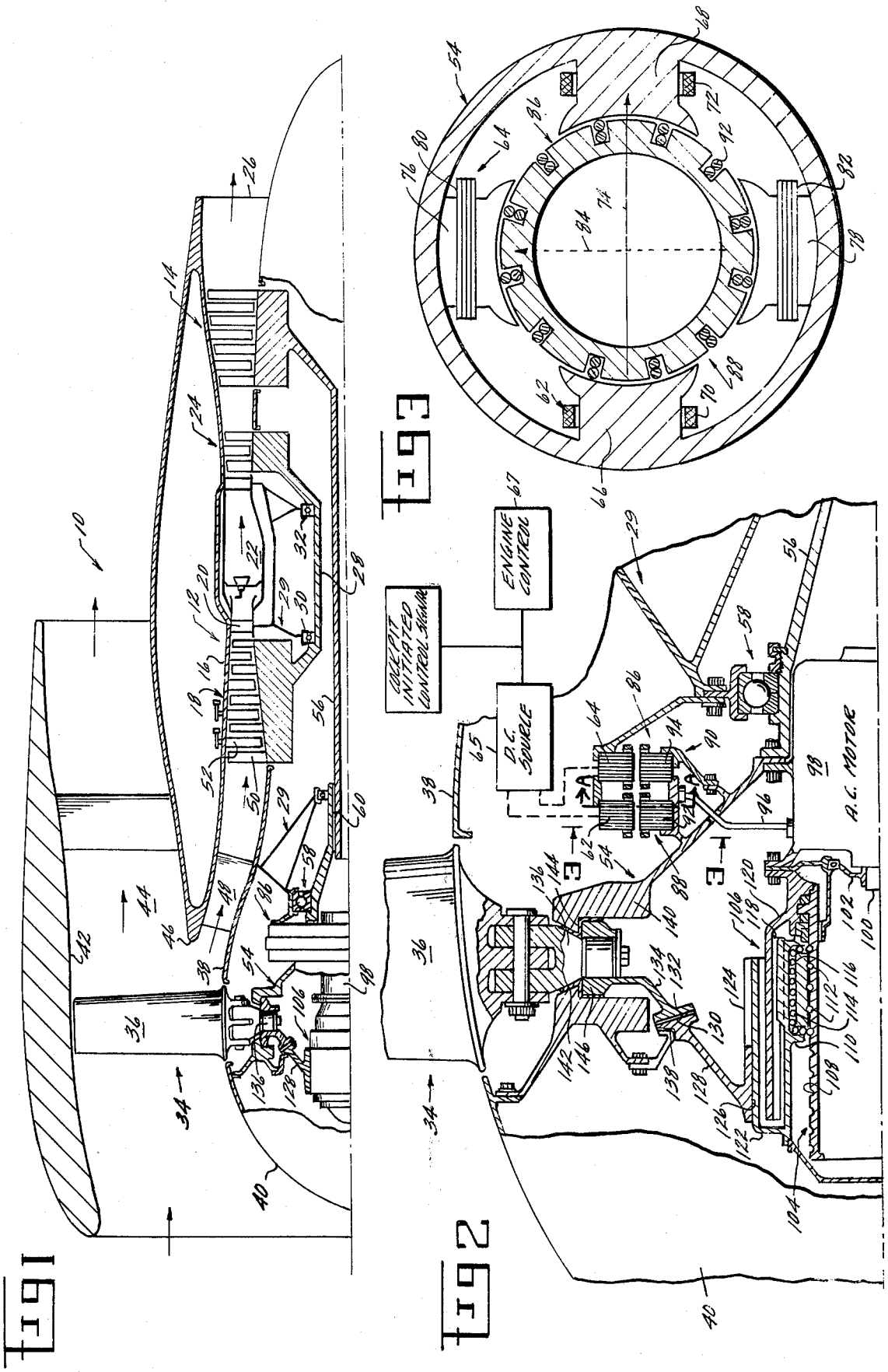

3,900,274

REMOTE CONTROLLED ACTUATION SYSTEM FOR THE ROTOR OF A GAS TURBINE ENGINE

BACKGROUND OF THE INVENTION

This invention relates to a remote controlled actuation system for the rotor of a gas turbine engine, and more particularly to an actuation system for the rotor of a gas turbine engine wherein the actuator may be remotely powered and controlled from a non-rotating portion of the engine without the use of slip rings, brushes, or other interconnecting structure which may wear or fail.

In a gas turbine engine, it is often necessary during engine operation to selectively actuate or move some variable geometry component which is mounted on board the engine rotor. For example, in an aircraft gas turbine engine of the variable pitch fan type it is often necessary to continuously adjust the pitch of the fan blades to meet the dictates of the flight mission. Difficulty arises because the control signal for varying the blade pitch must originate from the non-rotating portion of the engine and then be transferred across the boundary between the non-rotating portion of the engine and the engine rotor. In cases where the control signal is electrical, the use of brushes contactable with slip rings has been suggested; however, such an arrangement inherently includes a frictional contact between rotating and non-rotating components wherein the contact is subject to wear and failure. Should an electric motor be chosen as the means of actuation and stationed on board the engine rotor, then additional brushes and slip rings would be required to furnish power to the motor as well as the control signal.

The problem is not confined solely to variable pitch fan engines and other types of gas turbine engines may also require the use of an actuation system mounted on board the engine rotor. For example, in gas turbine engines of the supersonic type, it is common to include a translatable inlet spike which may be adjusted to compensate for the supersonic inlet shock wave. In such engines, it may be convenient if the inlet spike is made rotatable with the engine rotor in which case some type of actuation means would be required on board the rotor. For engines and aircraft operating at subsonic speeds, it may become necessary to provide a translatable inlet spinner which may be actuated to choke the effective inlet area in order to attenuate engine generated noise during low level flight. Thus it becomes apparent that a rotor mounted actuation system for a gas turbine engine may have many applications and may be increasingly used provided a simple and reliable means can be found for transmitting a control signal and power between the stationary and rotating boundary.

Therefore it is a primary object of this invention to provide a simple and reliable remote controlled actuation system for the rotor of a gas turbine engine.

It is also an object of this invention to provide an actuation system for the rotor of a gas turbine engine wherein the actuator may be remotely powered and controlled from a non-rotating portion of the engine without the use of slip rings, brushes or other interconnecting structure which may wear or fail.

SUMMARY OF THE INVENTION

These and other objects and advantages will become clearly understood from the following detailed description and drawings, all of which are intended to be representative of, rather than in any way limiting on, the scope of invention. In a gas turbine engine having a static frame and rotor, there is provided a remote controlled actuation system for the rotor. The system comprises an electric actuator motor mounted for rotation with the rotor. A stator winding means is fixedly connected to the static frame and a rotor winding is provided in fixed connection to the rotor for rotation therewith. An electrical connection is provided between the rotor winding means and actuator motor so that rotation of the rotor operates to induce an electromotive force in the rotor windings to drive the motor when the stator windings receive an excitation current. Means are also provided for varying the level and polarity of excitation current applied to the stator winding means.

DESCRIPTION OF THE DRAWINGS

While the specification concludes with claims distinctly claiming and particularly pointing out the invention described herein, it is believed that the invention will be more readily understood by reference to the discussion below and the accompanying drawings in which:

FIG. 1 is a cross-sectional view of a portion of a gas turbine engine having the remote controlled actuation system of this invention.

FIG. 2 is a schematic diagram combined with an enlargement of a portion of FIG. 1.

FIG. 3 is a sectional view of section A—A in FIG. 2.

DESCRIPTION OF THE PREFERRED EMBODIMENT

Referring to FIG. 1, there is shown a turbofan engine 10 of the high bypass type having a core or gas generator 12 together with a low pressure turbine 14 housed within an outer cylindrical casing 16. The gas generator 12 includes a compressor 18, a diffuser outlet passage 20, a combustor 22, and a high pressure turbine 24, all of which are arranged in an axially spaced serial flow relationship. The downstream end of the cylindrical casing 16 terminates in an exhaust nozzle 26 which may be of the variable area type as is well known in the art. The compressor 18 and high pressure turbine 24 are interconnected by an annular shaft 28 which is journaled for rotation relative to a static frame structure shown generally at 29 by a forward bearing 30 and an aft bearing 32.

A variable pitch fan 34 is mounted upstream of the gas generator 12 and is driven by the low pressure turbine 14 through an interconnecting fan turbine shaft 56. The upstream end of the shaft 56 is splined at 60 to a rotating fan frame shown generally at 54 wherein the fan frame is journaled for rotation with respect to the static frame structure 29 by a bearing 58. The variable pitch fan 34 includes a plurality of circumferentially spaced apart variable pitch fan blades 36 disposed about an inner fairing 38 which extends forwardly of the variable pitch blades 36 and defines an upstream spinner 40. A static bypass duct 44 is provided between the inner fairing 38 and an outer spaced apart cowling 42.

The upstream end of the casing 16 as shown at 46 defines in cooperation with the fairing 38, a compressor inlet 48 communicating with a plurality of rotatable compressor blades 50 interspaced between a plurality of stator vanes 52 which may be of the variable type as is well known in the art. The compressor 18 is thus charged by the fan 34 and the variation of blade pitch not only varies the fan speed but, in effect, provides a variable first compressor stage. The pitch of the fan blades 36 may also be varied to reverse the air flow along the duct 44 and thus provide reverse thrust to aerodynamically brake a landing aircraft. The variable pitch fan blades 36, together with the spinner 40, are all interconnected for rotation about the engine axis by the rotating fan frame structure 54 which fixedly connects to the forward end of the fan turbine shaft 56 through the interconnecting splined coupling 60.

The upstream end of the static frame structure 29 supports two axially spaced apart stator or field windings 62, 64 as may be best seen by referring to the schematic diagram of FIG. 2. The forward winding is shown in FIG. 2 for simplicity of illustration as comprising only two poles 66, 68, although it will be readily understood that in actual practice, the winding would likely comprise some higher multiple of the two poles shown. Each pole has a respective coil 70, 72 of a predetermined number of turns so as to generate a magnetic field in the direction of arrow 74 when excited by direct current from a DC souce 65. In like manner, the aft winding 64 is also shown for simplicity as comprising only two poles 76, 78 having respective coils 80, 82 of a predetermined number of turns so as to generate a magnetic field in the direction of the arrow 84 when excited with direct current from the source 65 in a manner independent of the forward winding 62. The level and polarity of the current received from the source 65 may be controlled in a known manner in response to a control signal received either from the engine control 67 or the cockpit of an associated aircraft. As is readily apparent, the stator windings 62, 64 generate axially spaced magnetic fields which are 90° apart in phase.

Two axially spaced apart rotor windings 88, 90 are provided in attachment to the rotating fan frame 54 for rotation therewith. The windings 88, 90 respectively include pluralities of circumferentially spaced apart coils 92, 94, each of which has a predetermined number of turns. Rotation of the fan frame 54 during engine operation operates to induce an electromotive force (EMF) in the rotor windings 88, 90, generating alternating currents in the respective rotor windings wherein the alternating currents are phased 90° apart. The alternating currents from the rotor windings 88, 90 are then transmitted through interconnecting wires 96 to drive a two phase AC actuator motor 98 of a conventional type well known in the art.

The two phase AC motor 98 in turn is connected through its output shaft 100 and an interconnecting gear 102, which may be of the harmonic type, to drive the shaft 104 of a recirculating ball thread actuator 106, which is also of a conventional type well known in the art. The shaft 104 of the recirculating ball thread actuator includes a semicircular helical groove 108 along its length and an outside nut 110 fits over the shaft 104 and is internally machined with a corresponding semicircular helical groove 112 which together with the groove 108 define a ball track for the receipt of a plurality of balls 112. The balls 112 are continuously recirculated within the ball track through a return passageway 116 and thus operate to transfer rotational motion of the shaft 104 into linear motion of the nut 110. The outside surface of the nut 110 is pitch splined at 118 to a sleeve 120 which fixedly connects to the casing of the AC motor 98. In this manner the nut 110 is disposed for both linear translation and rotation with respect to the sleeve 120 upon rotation of the shaft 108.

The nut 110 includes an overlapping sleeved portion 122 formed integral therewith wherein there are also provided a plurality of circumferentially spaced apart straight teeth 124 disposed about the periphery of the sleeve 122. The teeth 124 in turn engage a corresponding plurality of circumferentially spaced apart teeth 126 disposed about the inner periphery of a unison bevel gear 128 such that translation and rotation of the nut 110 and integral overlapping sleeve 122 impart circumferential motion to the unison bevel gear 128. The outer rim of the bevel gear 128 has a plurality of circumferentially spaced apart teeth 130 formed therearound which engage teeth 132 extending from a plurality of circumferentially spaced apart sector gears 134. Each sector gear 134 is connected to a respective root portion 136 from a variable pitch fan blade 36. The axial loading between the outer rim of the unison bevel gear 128 and the individually spaced apart sector gears 134 may be accommodated by a simple dry lubricated thrust bearing 138 sandwiched between the forward face of the unison bevel gear 128 and the rotating fan frame structure.

The root portion 136 of each variable pitch fan blade 36 is thickened at its inner radial end to form a circumferential flange 146. The rotating fan frame 54 includes a reinforced cylindrical support section 140 which has a plurality of circumferentially spaced apart radial bores 142 therethrough, each one of which receives a root portion 136 from a variable pitch fan blade 36. The radial bores 142 each include an overlapping circumferential flange portion 144 aligned in substantially opposing relation to a corresponding circumferential flange 146 so as to maintain antifriction bearings therebetween. In this manner, each blade 36 is maintained for rotation about its center axis at the high centrifugal load forces which are incurred during high speed operation of the fan.

During engine and fan operation, direct current is applied to the two spaced apart stator windings 62, 64 so as to generate magnetic fields in the direction of arrows 74, 84 as previously discussed. Rotation of the fan frame 54 with respect to static frame 29 operates to induce an electromotive force (EMF) in each rotor winding 88, 90 so as to provide independent alternating currents phased 90° apart to drive the AC motor 98. The speed of the AC motor may be controlled up to synchronous speed by varying the DC excitation applied to one of the stator windings. For example, it will be assumed that the DC excitation applied to the stator winding 62 remains constant while the DC excitation applied to the stator winding 64 may be varied in order to vary the EMF induced in the rotor winding 90 and in this manner control the speed of the AC motor 98 up to synchronous speed. As is readily apparent the stator winding 64 to which the DC excitation is varied has been only arbitrarily determined for purposes of illustration and may be reversed depending on the particular requirements of a system. During normal fan operation when the pitch of the fan blades 36 remains constant, the DC excitation to the stator windings 62, 64 is turned off and there is no EMF induced in the rotor windings 88, 90. Thus the two phase AC actuator motor 98 fails to receive both phases of the two phase input current required to operate and rotate the output shaft 100. The nut 110 of the recirculating ball thread actuator 106 therefore remains stationary and locks the unison bevel gear 128 in place in turn locking the individual sector gears 134 and their associated blades 36 in place.

Should it become necessary to vary the pitch of the fan blades 36 in order to meet a different engine operating requirement in accordance with the dictates of the flight mission, it is then possible to increase the level of DC excitation to be applied to the stator windings 62, 64 and therefore induce an EMF in the rotor windings 88, 90. Hence the level of alternating current induced in the rotor windings 88, 90 is directly proportional to the level of DC excitation applied to the stator windings 62, 64. The speed of the output shaft 100 from the AC motor 98 may be controlled up to synchronous speed as a direct function of the level of DC excitation applied to the stator winding 64 without the use of interconnecting slip rings, brushes, etc. Operation of the AC motor 98 in turn rotates the shaft 104 of the recirculating ball thread actuator 106 causing the nut 110 to simultaneously translate and rotate along the pitched spline 118. Translation and rotation of the nut 110 and its associated integral sleeve 122 in turn imparts circumferential motion to the unison bevel gear 128 through coaction of the teeth 124, 126. This change in angular position of the unison bevel gear 128 is in turn simultaneously imparted to all the spaced apart sector gears 134 through the interengaging teeth 130, 132. Rotation of each sector gear about the fan blade center axis operates to simultaneously vary the pitch of all the fan blades.

If the fan blades are to be returned to their original pitch it becomes immediately apparent that the direction of rotation of the motor output shaft 100 must be reversed. This may be accomplished in a simple manner by reversing the original polarity of the DC excitation applied to the stator winding 64. Thus the speed at which the pitch of the blades 36 may be varied up to synchronous speed can be controlled as a direct function of the level of DC excitation applied to the stator winding 64 while the direction of blade 36 rotation may be controlled as a direct function of the polarity of the DC excitation applied to the stator winding 64. In this manner the pitch of the variable pitch blades 36 may be controlled in a simple and reliable manner without the use of slip rings, brushes or other interconnecting structure required to transfer a control signal between the static frame member and rotating frame member.

It should be readily understood that although the AC motor 98 has been depicted and described in relation to a mechanism for varying the pitch of a plurality of variable pitch fan blades, the invention is not so limited. The AC motor may be utilized for a variety of other purposes on the rotor of a gas turbine engine. For example, the AC motor may be connected to drive a mechanism which in turn varies the axial position of a rotating inlet centerbody as may be required for a gas turbine engine during supersonic operation or for sound attenuation during subsonic operation.

In addition, it will be appreciated by those of ordinary skill in the art that a simplified single stator construction would also be possible wherein the rotating windings may be arranged in either a two or three phase winding with the induced voltage level in all phases of the rotation windings being increased or decreased together. Such an arrangement would be particularly suitable if the power required to actuate the fan blades is large.

Therefore, having described the various preferred embodiments of the invention, though not exhaustive of all possible equivalents, what is desired to be secured by letters patent is claimed below.

What is claimed is:

1. In a machine having a static frame and rotor, a remote controlled actuation system for the rotor comprises:
   an electric actuator motor mounted for rotation with the rotor,
   stator winding means in fixed connection to the static frame,
   rotor winding means in fixed connection to the rotor for rotation therewith and in electrical connection to the motor wherein rotation of the rotor operates to induce an electromotive force in the rotor windings to drive the actuator motor when the stator windings receive an excitation current, and
   means for varying the level and polarity of excitation current applied to the stator winding means.

2. The machine of claim 1 wherein:
   the machine is a gas turbine engine,
   the stator winding means include two axially spaced apart stator windings each having at least two poles so as to generate axially spaced magnetic fields which are 90° apart in phase, and
   the rotor winding means include two axially spaced apart rotor windings such that rotation of the rotor operates to induce an electromotive force in the rotor windings generating alternating currents which are phased 90° apart electrically in the respective rotor windings.

3. The gas turbine engine of claim 2 wherein the stator windings are excited by direct current and the electric motor is of the two phase alternating current type wherein variation of the level and polarity of the direct current to one of the stator windings operates respectively to vary the speed and direction of rotation of the motor.

4. In a gas turbine engine of the variable pitch fan type having a static frame and rotatable fan frame, an actuation system for the variable pitch fan comprises:
   an electric motor mounted for rotation with the rotatable fan frame,
   stator winding means in fixed connection to the static frame,
   rotor winding means in fixed connection to the fan frame for rotation therewith and in electrical connection to the motor wherein rotation of the rotor operates to induce an electromotive force in the rotor windings to drive the motor when the stator windings receive an excitation current,
   means interconnecting the motor to the fan in order that operation of the motor may be converted into variation of the pitch of the fan blades, and
   means for varying the level and polarity of excitation current applied to the stator winding means.

5. The gas turbine engine of claim 4 wherein:
   the stator winding means include two axially spaced apart stator windings each having at least two poles so as to generate axially spaced magnetic fields which are 90° apart in phase, and
   the rotor winding means include two axially spaced apart rotor windings such that rotation of the rotor operates to induce an electromotive force in the rotor windings generating alternating currents which are phased 90° apart electrically in the respective rotor windings.

6. The gas turbine engine of claim 5 wherein the stator windings are excited by direct current and the electric motor is of the two phase alternating current type wherein variation of the level and polarity of the direct current to one of the stator windings operates respectively to vary the speed and direction of rotation of the motor.

7. The gas turbine engine of claim 4 wherein the means interconnecting the motor to the fan include a recirculating ball thread actuator, the shaft of which is drivably connected to the motor and the nut of which is threadably engaged to a unison bevel gear which simultaneously engages the teeth of a plurality of circumferentially spaced apart sector gears, each of which connects to a root portion of a respective variable pitch fan blade such that operation of the motor drives the shaft of the recirculating ball thread actuator to linearly translate the nut of the recirculating actuator which in turn imparts circumferential motion to the unison bevel gear so as to simultaneously drive the sector gears and their associated variable pitch fan blades.

* * * * *